(12) United States Patent
Steinberger

(10) Patent No.: US 9,017,174 B2
(45) Date of Patent: Apr. 28, 2015

(54) SLIP CLUTCH

(71) Applicant: Schaeffler Technologies GmbH & Co. KG, Herzogenaurach (DE)

(72) Inventor: Markus Steinberger, Macedonia, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 19 days.

(21) Appl. No.: 13/849,096

(22) Filed: Mar. 22, 2013

(65) Prior Publication Data

US 2013/0256084 A1    Oct. 3, 2013

Related U.S. Application Data

(60) Provisional application No. 61/616,160, filed on Mar. 27, 2012.

(51) Int. Cl.

| | |
|---|---|
| F16D 7/02 | (2006.01) |
| F16D 7/08 | (2006.01) |
| F16F 15/134 | (2006.01) |
| F16D 13/56 | (2006.01) |
| F16D 3/14 | (2006.01) |
| F16D 7/04 | (2006.01) |

(52) U.S. Cl.
CPC ... F16D 13/56 (2013.01); F16D 3/14 (2013.01); F16D 7/044 (2013.01); F16D 7/08 (2013.01)

(58) Field of Classification Search
USPC ............ 464/35–39, 42–44, 68.1, 68.4, 68.41; 192/30 V, 56.32, 56.33
See application file for complete search history.

(56) References Cited

U.S. PATENT DOCUMENTS

| | | | | |
|---|---|---|---|---|
| 1,739,947 | A | * | 12/1929 | Chilton ........................... 464/36 |
| 1,813,372 | A | * | 7/1931 | Wildhaber .................. 464/68.1 |
| 2,773,370 | A | | 12/1956 | Intraub et al. |
| 3,323,328 | A | | 6/1967 | Montgomery |
| 4,062,203 | A | * | 12/1977 | Leonard et al. ................. 464/38 |
| 4,318,283 | A | * | 3/1982 | Windish ..................... 464/68.41 |
| 4,583,959 | A | * | 4/1986 | Yoneda ....................... 464/68.41 |
| 4,911,278 | A | * | 3/1990 | Kabayama et al. ......... 192/30 V |
| 5,839,962 | A | * | 11/1998 | Rohs et al. ................. 464/68.41 |
| 6,312,339 | B1 | * | 11/2001 | Beyert ............................ 464/36 |
| 7,682,255 | B2 | | 3/2010 | Monis et al. |
| 7,819,751 | B2 | * | 10/2010 | Ebata ........................ 464/68.41 |

* cited by examiner

*Primary Examiner* — Gregory Binda
*Assistant Examiner* — Josh Skroupa
(74) *Attorney, Agent, or Firm* — Simpson & Simpson, PLLC

(57) ABSTRACT

A slip clutch, including: a flywheel; and a vibration damper including: first and second cover plates; a flange; and at least one spring engaged with the cover plates and flange. The clutch includes a slip assembly, with a first plurality of circumferentially aligned surfaces: fixedly connected to the flywheel or formed with the flywheel; and at an acute angle with respective to a circumferential line, and a second plurality of circumferentially aligned surfaces: formed by a portion of the first cover plate radially outward of the spring; at an acute angle with respective to a circumferential line; and in contact with the first plurality of surfaces, or engaged with the first plurality of surfaces via an intermediate element in contact with the first and second pluralities of surfaces. The slip assembly includes a resilient element applying a force to the first cover plate in an axial direction toward the flywheel.

20 Claims, 8 Drawing Sheets

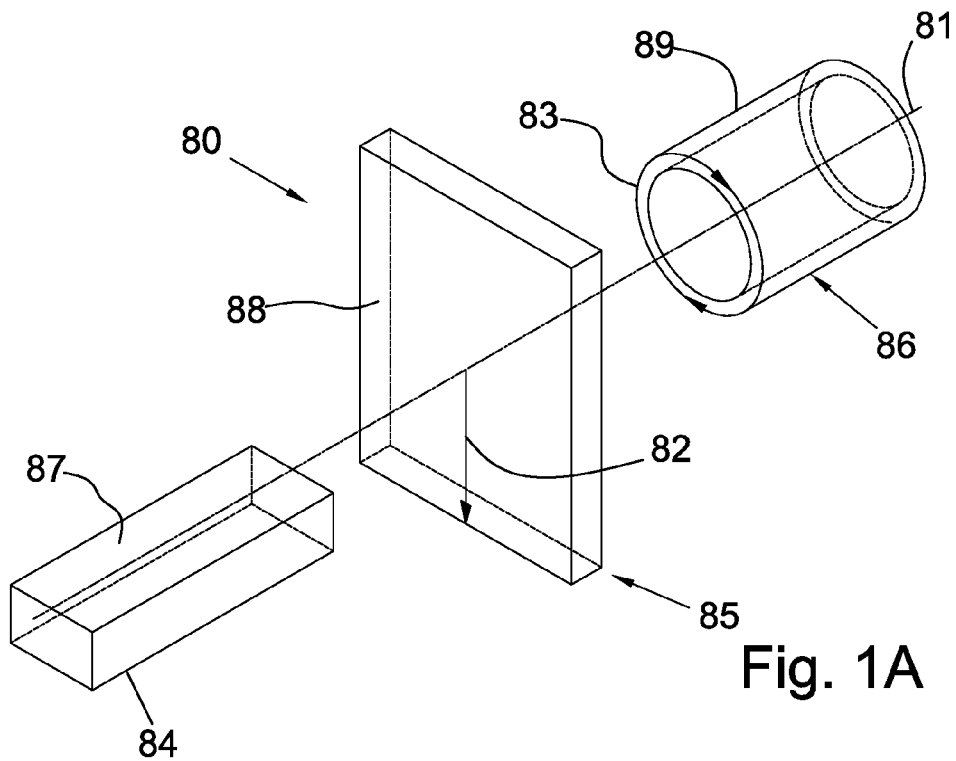
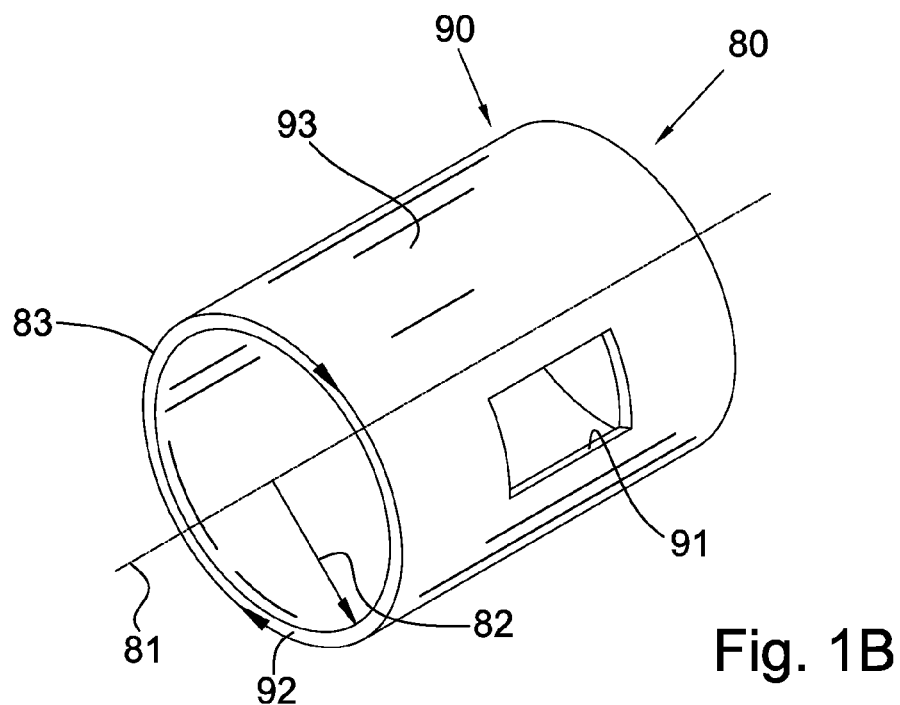

US 9,017,174 B2

SLIP CLUTCH

CROSS-REFERENCE TO RELATED APPLICATIONS

This application claims the benefit under 35 U.S.C. §119(e) of U.S. Provisional Patent Application No. 61/616,160 filed Mar. 27, 2012, which application is incorporated herein by reference.

TECHNICAL FIELD

The present disclosure relates a slip clutch, in particular, a slip clutch for hybrid applications.

BACKGROUND

It is known to limit torque in a torque transmitting device by use of a friction clutch, for example as taught by U.S. Pat. No. 3,323,328. However, significant compression forces are needed to engage the friction clutch, reducing controllability of the clutch. Further, the elements needed to provide the compressive force increase the installation space needed for the clutch. It also is known to limit torque in a torque transmitting device by use of a preloaded ball clutch, for example, as taught by U.S. Pat. No. 2,773,370. However, due to high unit loading at the contact points for the clutch, such clutches have reduced durability.

SUMMARY

According to aspects illustrated herein, there is provided a slip clutch, including: an axis of rotation; a flywheel arranged to receive torque; and a vibration damper including: first and second axially displaceable cover plates; a flange for transmitting torque from the vibration damper; and at least one spring engaged with the cover plates and the flange. The clutch includes a slip assembly, with a first plurality of circumferentially aligned surfaces: fixedly connected to the flywheel or formed from a same piece of material as the flywheel; and at a first acute angle with respective to a first circumferential line passing through the first plurality of circumferentially aligned surfaces, and a second plurality of circumferentially aligned surfaces: formed by a first portion of the first cover plate radially outward of the at least one spring; at a second acute angle with respective to a second circumferential line passing through the second plurality of circumferentially aligned surfaces; and in contact with the first plurality of circumferentially aligned surfaces, or engaged with the first plurality of circumferentially aligned surfaces via at least one intermediate element in contact with the first and second pluralities of circumferentially aligned surfaces. The slip assembly includes a resilient element applying a force to the first cover plate in an axial direction toward the flywheel.

According to aspects illustrated herein, there is provided a slip clutch, including: an axis of rotation; a flywheel arranged to receive torque; and a vibration damper including: first and second axially displaceable cover plates; a flange for transmitting torque from the vibration damper; and at least one spring engaged with the cover plates and the flange. The slip clutch includes: a slip assembly with a first plurality of circumferentially aligned surfaces: fixedly connected to the flywheel or formed from a same piece of material as the flywheel; and at an acute angle with respective to a first circumferential line passing through the first plurality of circumferentially aligned surfaces, and a second plurality of circumferentially aligned surfaces: in contact with the first plurality of circumferentially aligned surfaces; formed by a first portion of the first cover plate radially outward of the at least one spring; and at the acute angle with respective to a second circumferential line passing through the second plurality of circumferentially aligned surfaces. The slip assembly includes a resilient element urging the second plurality of circumferentially aligned surfaces into contact with the first plurality of circumferentially aligned surfaces. When first rotational torque is applied to the flywheel, the flywheel and the first and second cover plates rotate in unison. When second rotational torque, greater than the first rotational torque, is applied to the flywheel, the first plurality of circumferentially aligned surface is arranged to slide across the second plurality of circumferentially aligned surfaces such that the flywheel rotates with respect to the first and second cover plates.

According to aspects illustrated herein, there is provided a slip clutch, including: an axis of rotation; a flywheel arranged to receive torque; a backing plate fixedly connected to the flywheel; and a vibration damper including: first and second axially displaceable cover plates; a flange for transmitting torque from the vibration damper; and at least one spring engaged with the cover plates and the flange. The slip clutch includes a slip assembly, with a first plurality of circumferentially aligned surfaces: fixedly connected to the flywheel or formed from a same piece of material as the flywheel; and at an acute angle with respective to a first circumferential line passing through the first plurality of circumferentially aligned surfaces, and a second plurality of circumferentially aligned surfaces: formed by a first portion of the first cover plate radially outward of the at least one spring; and at the acute angle with respective to a second circumferential line passing through the second plurality of circumferentially aligned surfaces; and at least one cylindrically-shaped element axially disposed between the first and second pluralities of circumferentially aligned surfaces and engaged with the first and second pluralities of circumferentially aligned surfaces. The slip assembly includes a resilient element engaged with the backing plate and the second cover plate and urging the first cover plate toward the flywheel, such that the first and second pluralities of circumferentially aligned surfaces are compressive engagement contact with the at least one cylindrically-shaped element.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application; and, FIG. 2 is an exploded view of slip clutch;

DETAILED DESCRIPTION

Figure 2:
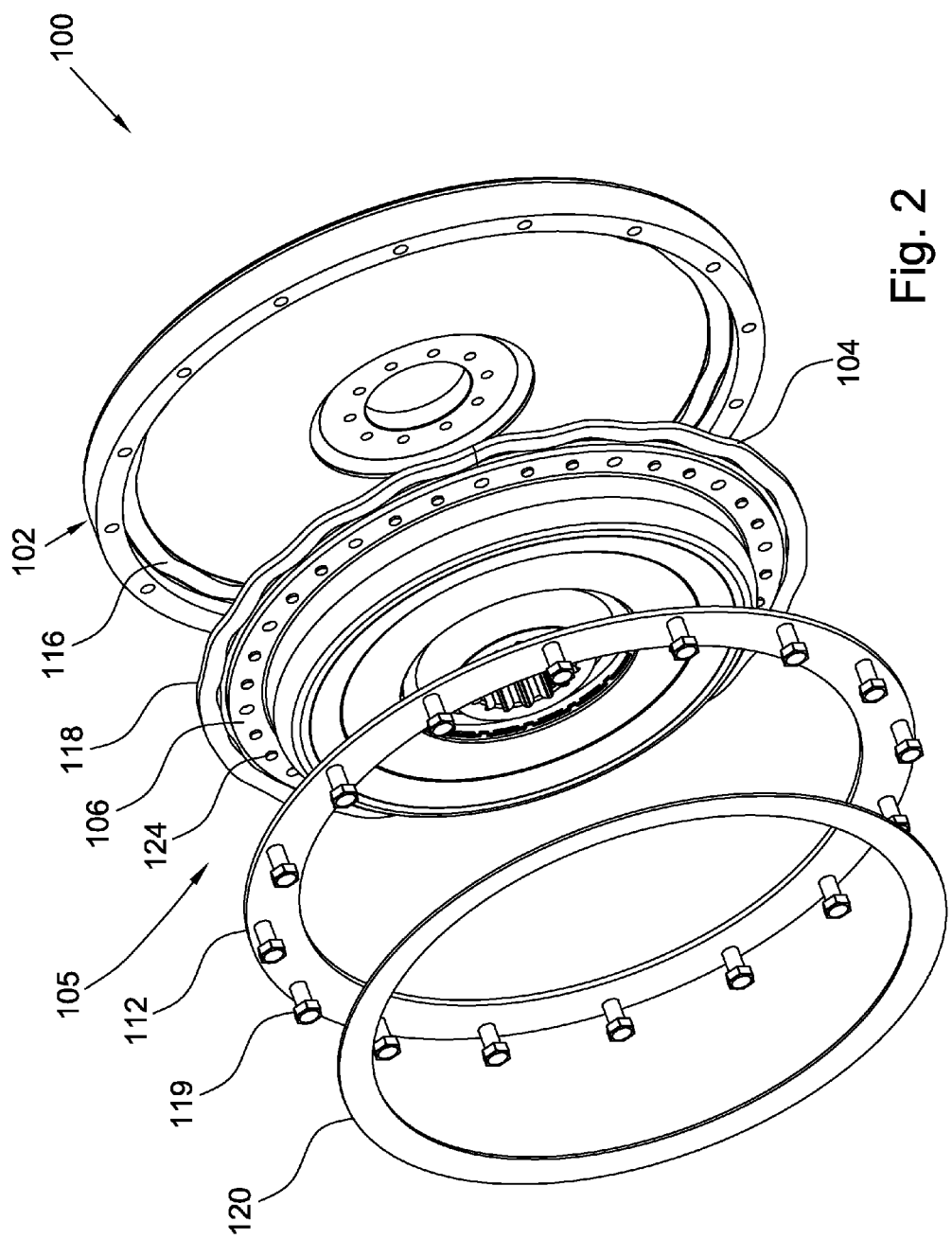

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

FIG. 2 is an exploded view of slip clutch 100.

Figure 3:
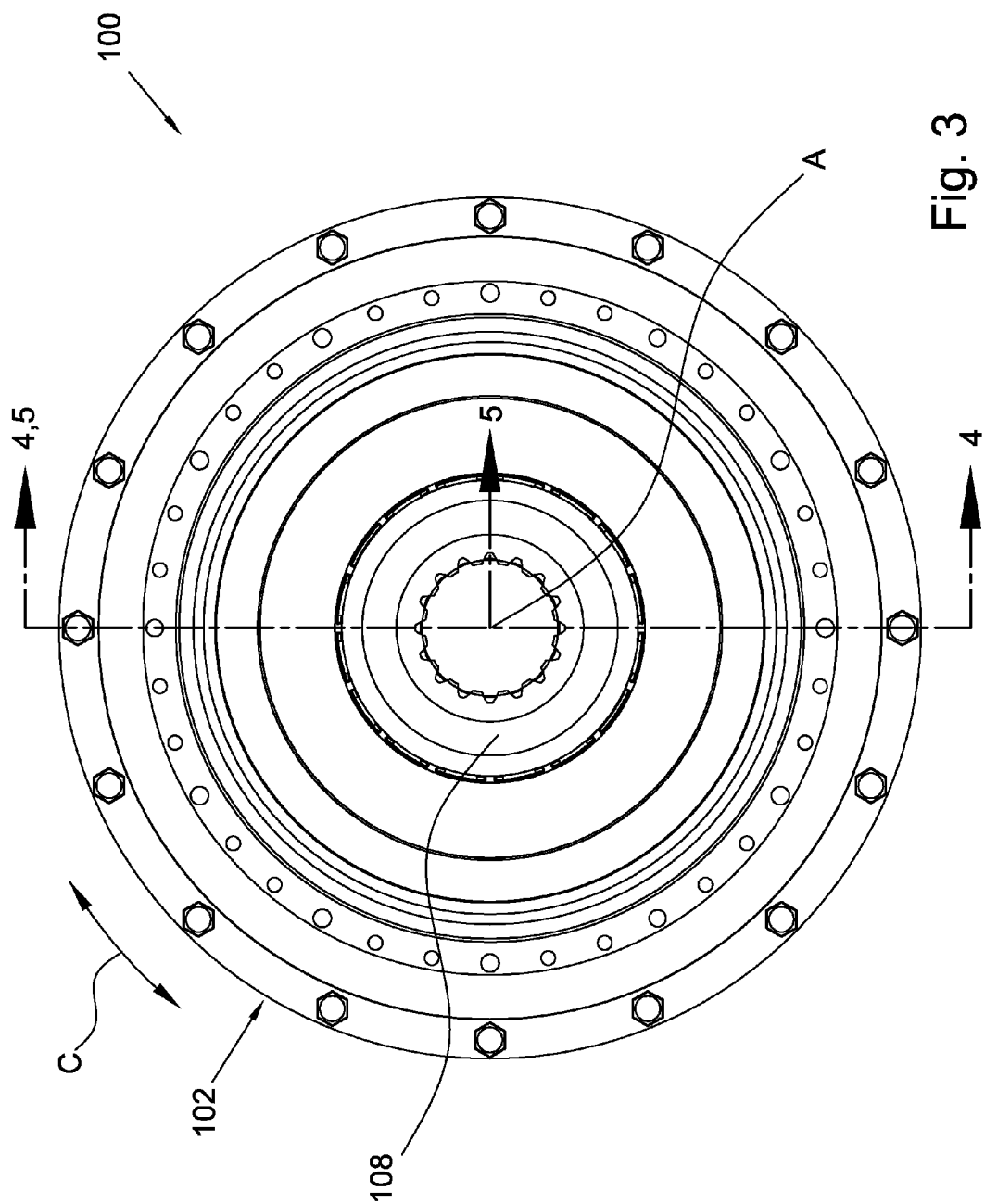
FIG. 3 is a front view of the slip clutch of FIG. 2.

FIG. 3 is a front view of slip clutch 100 of FIG. 2.

Figure 4:
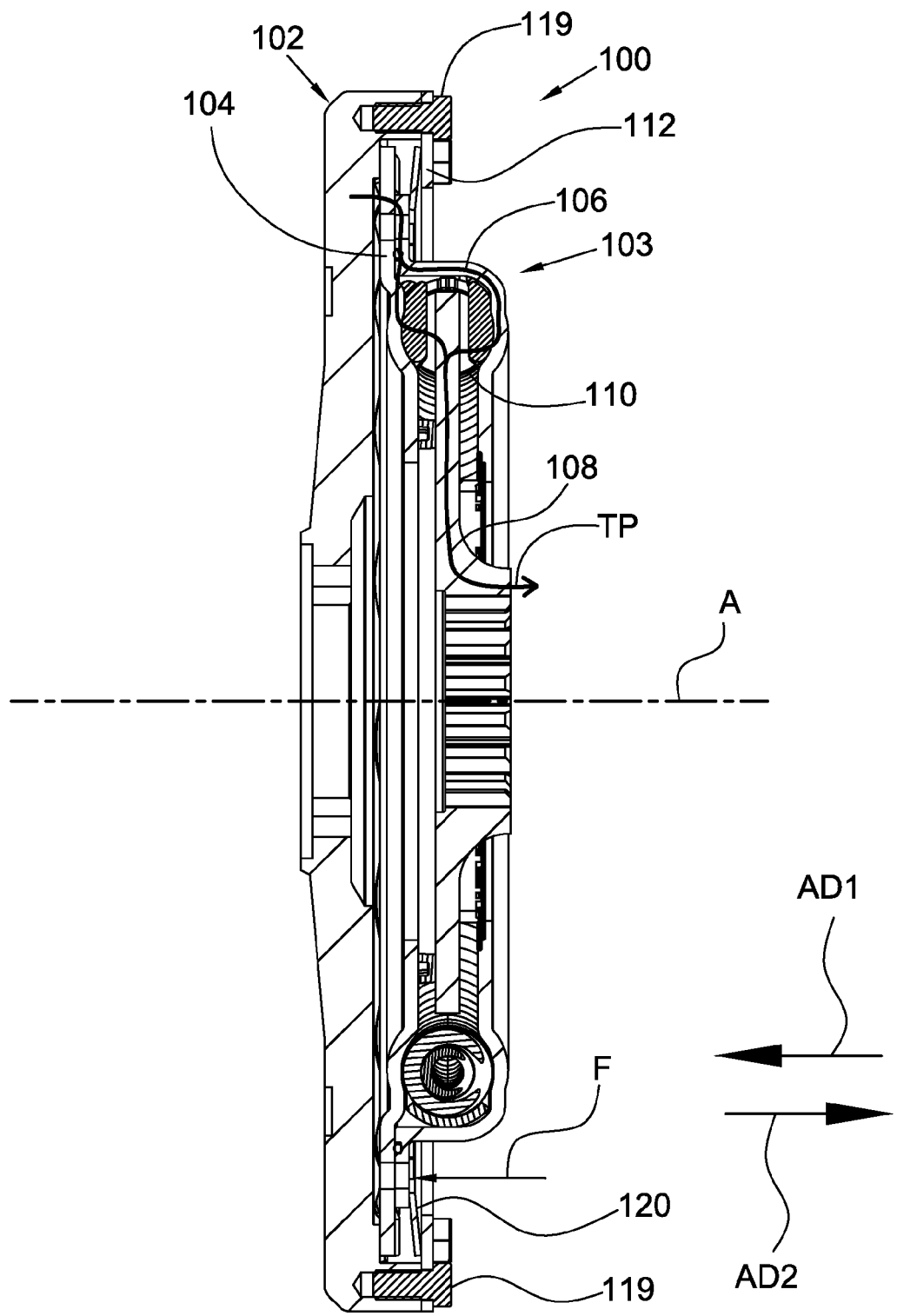
FIG. 4 is a cross-sectional view generally along line 4-4 in FIG. 3.

FIG. 4 is a cross-sectional view generally along line 4-4 in FIG. 3.

Figure 5:
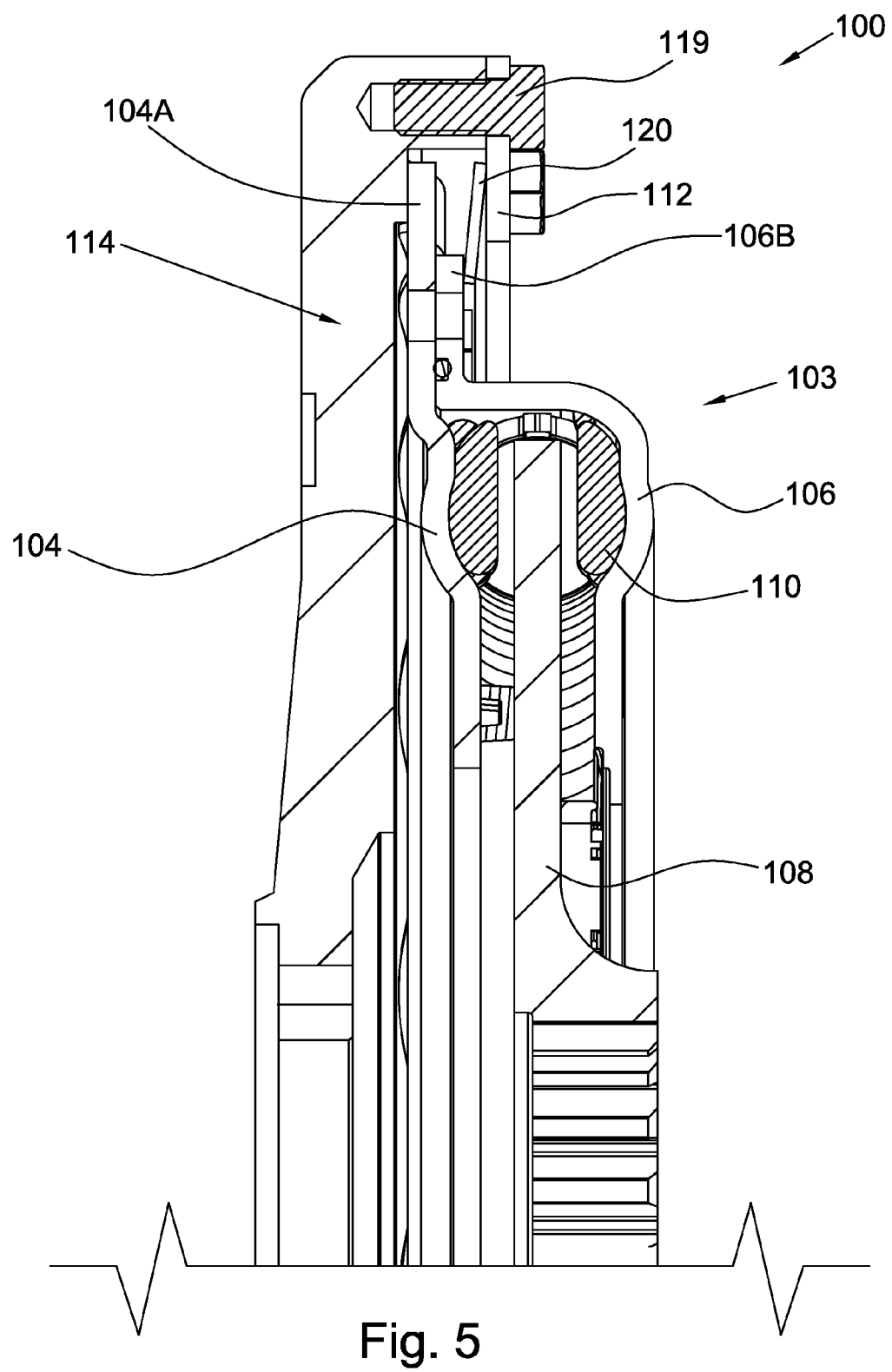
FIG. 5 is a cross-sectional view generally along line 5-5 in FIG. 3.

FIG. 5 is a cross-sectional view generally along line 5-5 in FIG. 3. The following should be viewed in light of FIGS. 2 through 5. Slip clutch 100 includes axis of rotation A, flywheel 102 arranged to receive torque, and vibration damper 103 including axially displaceable cover plates 104 and 106, which act as an input to the damper, flange 108 for transmitting torque from the damper, and at least one spring 110 engaged with cover plates 104 and 106 and the flange.

Figure 6:
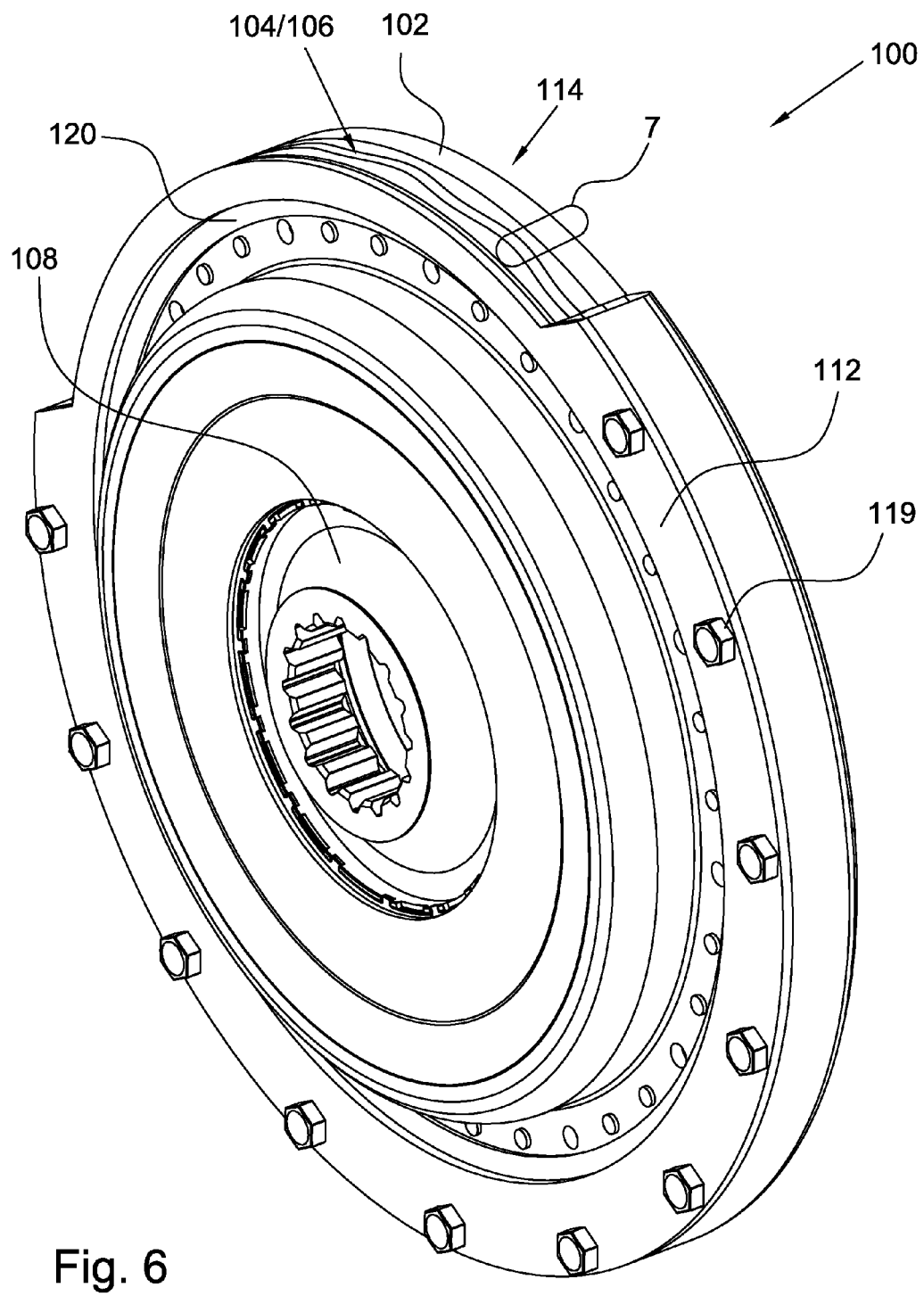
FIG. 6 is a perspective front view of the slip clutch of FIG. 2 with a partial cut-away of the outside circumference.

FIG. 6 is a perspective front view of slip clutch 100 of FIG. 2 with a partial cut-away of the outside circumference. The following should be viewed in light of FIGS. 2 through 6. The clutch includes backing plate 112 fixedly connected to the flywheel, for example by fasteners 119, and slip assembly 114 including circumferentially aligned surfaces 116 and 118. Resilient element 120 urges the cover plates toward the flywheel, for example, the resilient elements reacts with the backing plate to apply force F to cover plate 104 in axial direction AD1. In an example embodiment, the resilient element urges cover plate 104 into contact with the flywheel. In an example embodiment, the resilient element is radially outward of spring 110. In an example embodiment, the resilient element urges surfaces 116 and 118 into contact. In an example embodiment, the resilient element urges surfaces 116 and 118 into frictional contact or compressive engagement. By frictional contact, we mean frictional forces between surfaces 116 and 118 resist movement of surfaces 116 and 118 with respect to each other. By compressive engagement, we mean that an axial force pushes the surfaces together against the resistance of the surfaces. In an example embodiment, the resilient element is a diaphragm spring.

Surface 116 is separately formed from the flywheel and fixedly connected to the flywheel or is formed from a same piece of material as the flywheel, that is, surface 116 is integral to the flywheel as shown in FIGS. 2 through 6. Surface 118 is formed by portion 104A of cover plate 104 radially outward of the spring 110. By 'fixedly connected' we mean that no movement is possible between the components in question.

Figure 7:
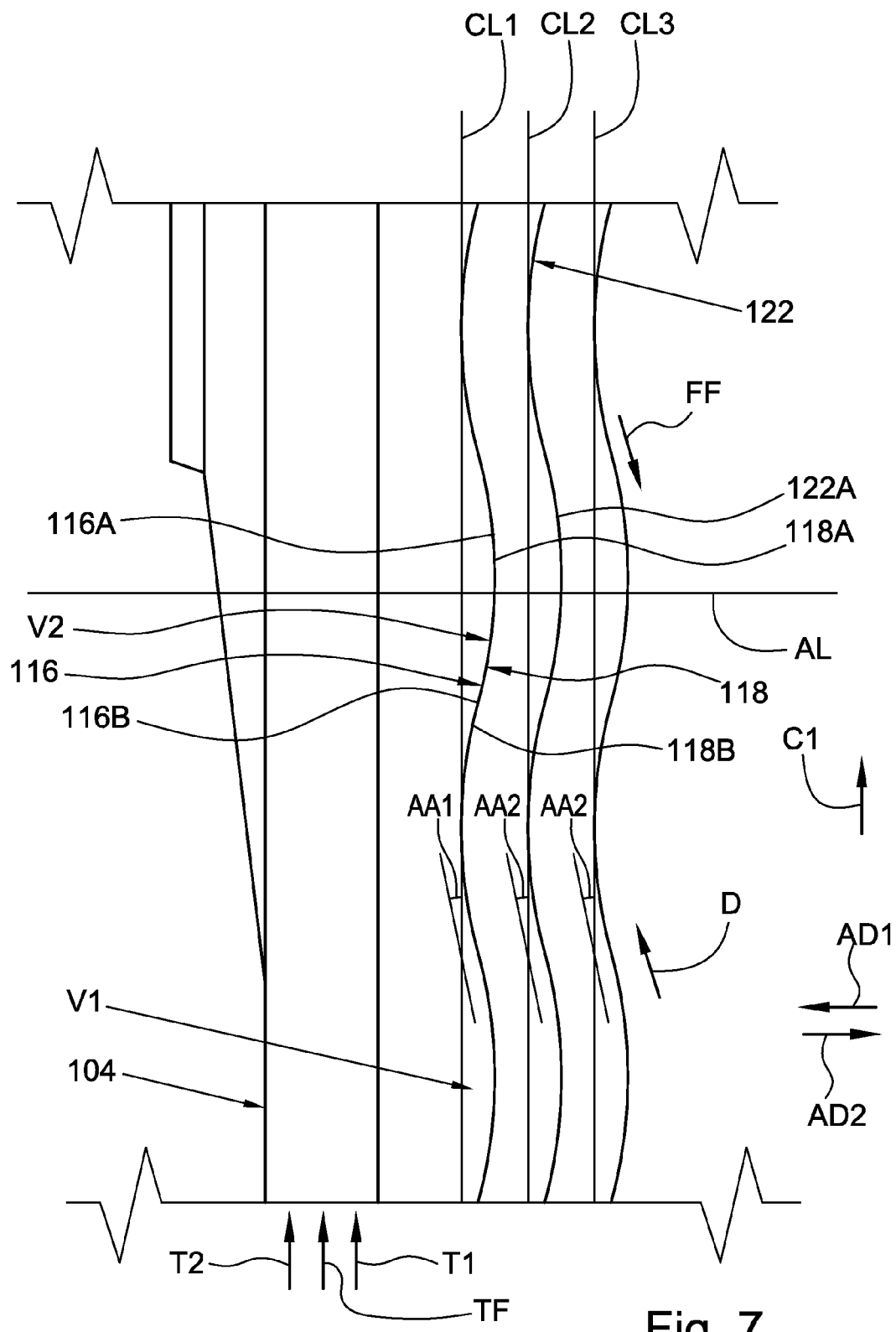
FIG. 7 is a detail of area 7 of FIG. 6.

FIG. 7 is a detail of area 7 in FIG. 6 with portion 106B radially extended. Portions of surface 116, for example, 116A, are at acute angle AA1 with respect to circumferential line CL1 passing through surface 116. As well, surfaces 116A are non-parallel with a line parallel to A, for example AL. Portions of surface 118, for example, 118A, are at acute angle AA2 with respect to circumferential line CL2 passing through surface 118. As well, surfaces 118A are non-parallel with a line parallel to A, for example AL. In an example embodiment, the acute angles are equal. Depending on the configuration of surfaces 116 and 118, and the relative positions of the flywheel and cover plate, lines CL1 and CL2 can be co-linear. In an example embodiment, portions of surface 116 between surfaces 116A, for example, 116B, are at acute angle AA1 with respective to circumferential line CL1 passing through surface 116. In an example embodiment, portions of surface 118 between surfaces 118A, for example, 118B, are at acute angle AA2 with respective to circumferential line CL2 passing through surface 118.

Surfaces 116 and 118 are at least partially axially aligned, for example, at least partially aligned in direction AD1. In an example embodiment, cover plate 106 includes portion 106A with circumferentially aligned surfaces 122A at acute angle AA2 with circumferential line CL3 passing through surfaces 122. Thus, surface 122 mirrors or is complementary to surfaces 118. In an example embodiment, portions 104A and 106A are fixedly connected to each other, for example by rivets 124

Figure 8:
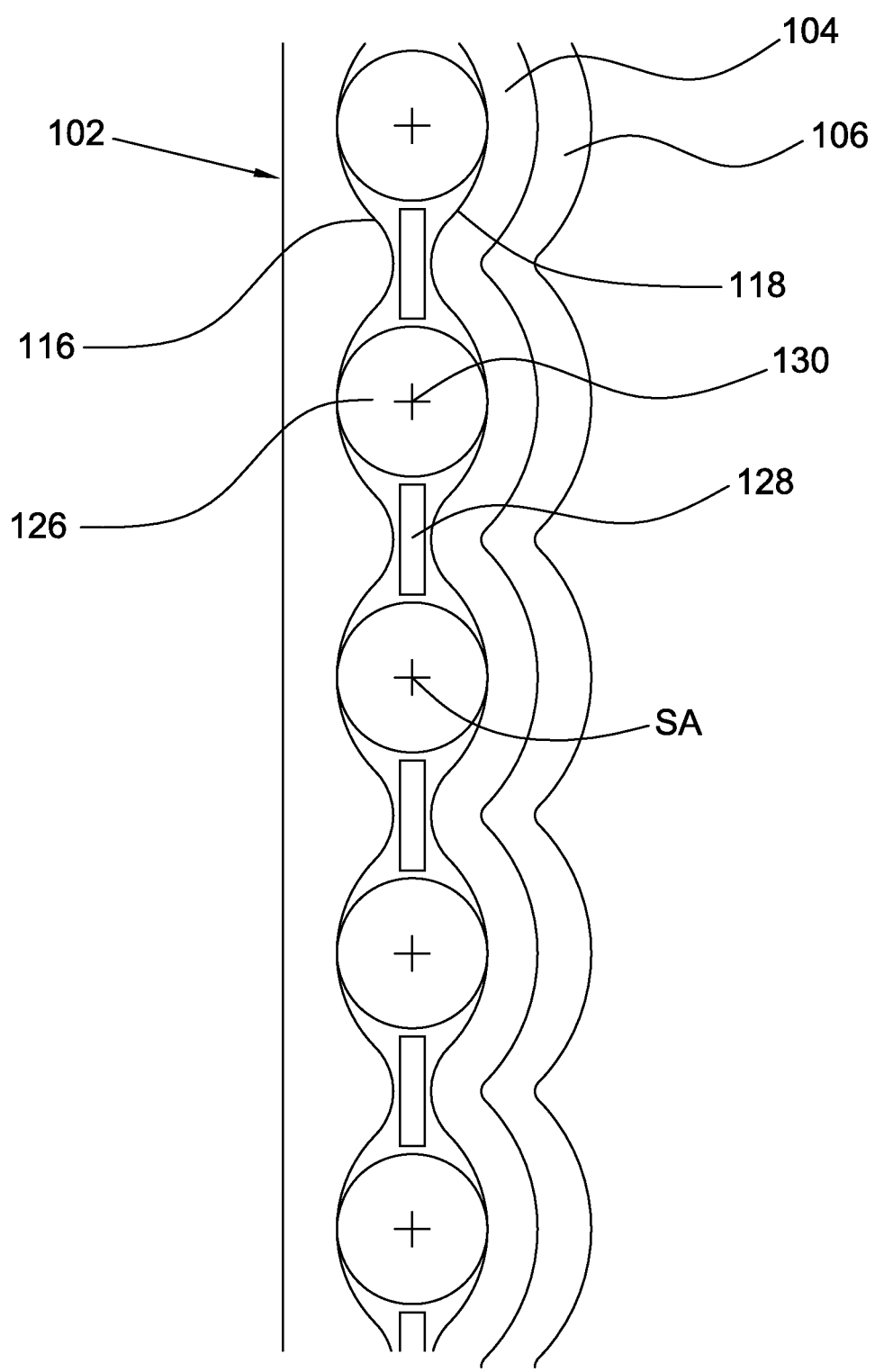
FIG. 8 is a cross-sectional view showing rollers in the slip clutch of FIG. 2.

FIG. 8 is a cross-sectional view showing rollers in the slip clutch of FIG. 2. In an example embodiment, clutch 100 includes a plurality of cylindrically-shaped elements 126 disposed between the surfaces 116 and 118 and engaged with surfaces 116 and 118. The resilient element urges surfaces 116 and 118 into contact with the cylindrically-shaped elements. Cage 128 ensures a substantially fixed circumferential position of elements 126 as further described below. It should be understood that clutch 100 is not limited to a particular number or configuration of elements 126.

Slip clutch 100 functions to intercept torque spikes transmitted to the flywheel that could cause damage to components downstream of the flywheel in torque path TP for the clutch, by enabling the flywheel to rotate with respect to the cover plates in response to such spikes. In general, to enable the flywheel to rotate with respect to the cover plates, rotational forces applied by the flywheel must overcome force F in axial direction AD1 from the resilient element and frictional force between components of the slip clutch in contact, such as surfaces 116 and 118, or surfaces 116 and 118 and element 126. For example, in general, for rotational torque T1 applied to the flywheel in direction C1, the flywheel and the cover plates are arranged to rotate in unison. In this mode of operation, torque on TP is within the respective capacities of the other components of the slip clutch. For rotational torque T2, greater than T1, applied to the flywheel in direction C1, the flywheel is arranged to at least partially rotate with respect to the cover plates. Thus, instead of transmitting the torque to the cover plates and TP, the flywheel rotates, or slips, with respect to the cover plates. T2 can be selected such that respective torque capacities for components downstream of the flywheel are not surpassed. It should be understood that some rotation of the cover plates may occur during the application of T2, but that overall, the flywheel rotates relative to the cover plates.

In the example shown in FIGS. 2 through 7, for T2, surfaces 116A are arranged to slide across surfaces 118A in direction D, which is partially in circumferential direction C1 for the flywheel, and partly in axial direction AD1. At the same time, surfaces 116A are pushing surfaces 118A in direction AD2. T2 generates sufficient force to overcome F and the frictional force between surfaces 116 and 118 such that the cover plates displace in direction AD2, rotating the flywheel with respect to the cover plates. Thus, rather than transmitting T2 to the cover plates, T2 is expended in overcoming F and the frictional forces to slide surface 116 across surface 118.

For T1, surfaces 116 and 118 remain in contact, that is the flywheel and the cover plates rotate together. Respective adjacent surfaces 118A/118B form respective valleys, for example, V1 and V2. For T2, surfaces 116 slides across surfaces 118 as noted above. If T2 is high enough, surfaces 116A/116B in one valley slide across surface 118 to the next valley in the circumferential direction of the torque being applied to the flywheel. For example surfaces 116A/116B in valley V1 slide across surface 118 to valley V2. It should be understood that surfaces 116A/116B can shift by more than one valley depending on the magnitude of T2.

For T2 in FIG. 8, T2 generates sufficient force to overcome F and the frictional force between surfaces 116 and 118 and elements 126. As described above, surface 116 translates in direction D as elements 126, rotate, substantially in place, about respective axis SA, such that the flywheel rotates with respect to the cover plates. Thus, rather than transmitting T2 to the cover plates, T2 is expended in overcoming F and the frictional forces to translate surfaces 116 and rotate elements 126.

The resilient element applies force F in axial direction AD1, T1 and T2 result in tangential force TF in direction C1, and frictional contact of surfaces 116 and 118 produces frictional force FF. When TF is high enough, TF overcomes F and FF to cause relative motion between surfaces 116 and 118, and subsequent relative motion between the flywheel and the cover plates. The break away torque, or torque on the flywheel required to overcome F and FF is a function of F, angles AA1/AA2, and a friction coefficient for surfaces 116 and 118. For example, assuming a constant frictional coefficient, increasing angles AA1/AA2 reduces the value of F needed to maintain a same break away torque. When the resilient element is a diaphragm spring, reducing the stiffness (reducing F) can advantageously increase controllability of clutch 100.

The discussion for the above examples was with respect to torque in direction C1. It should be understood that the discussion is applicable to torque in a direction opposite C1.

In an example embodiment, grease or other lubricant is applied to surfaces 116 and 118 to prevent corrosion to the surfaces, which could bind the surfaces together.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What I claim is:

1. A slip clutch, comprising:
    a flywheel arranged to receive torque;
    a vibration damper including:
        first and second axially displaceable cover plates;
        a flange arranged to transmit torque from the vibration damper; and,
        at least one spring engaged with the first and second cover plates and the flange; and,
    a slip assembly, including:
        a first plurality of circumferentially aligned surfaces:
            fixedly connected to the flywheel or formed from a same piece of material as the flywheel; and,
            at a first acute angle with respect to a first circumferential line passing through the first plurality of circumferentially aligned surfaces;
        a second plurality of circumferentially aligned surfaces:
            formed by a first portion of the first cover plate radially outward of the at least one spring;
            at a second acute angle with respect to a second circumferential line passing through the second plurality of circumferentially aligned surfaces; and,
            in contact with the first plurality of circumferentially aligned surfaces, or engaged with the first plurality of circumferentially aligned surfaces via at least one intermediate element in contact with the first and second pluralities of circumferentially aligned surfaces; and,
        a resilient element applying a force to the first cover plate in an axial direction toward the flywheel, wherein an entirety of the at least one spring is located radially outward from an axis of rotation for the clutch.

2. The slip clutch of claim 1, wherein the resilient element urges the first cover plate into engagement with the flywheel.

3. The slip clutch of claim 1, wherein the resilient element urges the second plurality of circumferentially aligned surfaces into contact with the first plurality of circumferentially aligned surfaces.

4. The slip clutch of claim 1, wherein the first and second pluralities of circumferentially aligned surfaces are axially aligned.

5. The slip clutch of claim 1, further comprising a backing plate fixedly connected to the flywheel, wherein the resilient element is engaged with the backing plate and the second cover plate.

6. The slip clutch of claim 1, wherein the resilient element is radially outward of the at least one spring.

7. The slip clutch of claim 1, wherein:
the second cover plate includes a second portion with a third plurality of circumferentially aligned surfaces at a third acute angle with respect to a third circumferential line passing through the third plurality of circumferentially aligned surfaces;
the second and third pluralities of circumferentially aligned surfaces are axially aligned; and,
the first and second portions are fixedly connected to each other.

8. The slip clutch of claim 1, wherein:
for a first amount of rotational torque applied to the flywheel, the flywheel and the first and second cover plates are arranged to rotate in unison; and,
for a second amount of rotational torque, greater than the first amount, applied to the flywheel, the flywheel is arranged to at least partially rotate with respect to the first and second cover plates.

9. The slip clutch of claim 8, wherein for the second amount of rotational torque applied to the flywheel, the first plurality of circumferentially aligned surfaces is arranged to slide across the second plurality of circumferentially aligned surfaces.

10. The slip clutch of claim 1, wherein:
the at least one intermediate element includes at least one cylindrically-shaped element disposed between the first and second pluralities of circumferentially aligned surfaces and engaged with the first and second pluralities of circumferentially aligned surfaces; and,
the resilient element urges the first and second pluralities of circumferentially aligned surfaces into contact with the at least one cylindrically-shaped element.

11. The slip clutch of claim 1, wherein the first and second acute angles are equal.

12. A slip clutch, comprising:
a flywheel arranged to receive torque;
a vibration damper including:
first and second axially displaceable cover plates;
a flange for transmitting torque from the vibration damper; and,
at least one spring engaged with the first and second cover plates and the flange; and,
a slip assembly, including:
a first plurality of circumferentially aligned surfaces:
fixedly connected to the flywheel or formed from a same piece of material as the flywheel; and,
at an acute angle with respect to a first circumferential line passing through the first plurality of circumferentially aligned surfaces;
a second plurality of circumferentially aligned surfaces:
in contact with the first plurality of circumferentially aligned surfaces;
formed by a first portion of the first cover plate radially outward of the at least one spring; and,
at the acute angle with respect to a second circumferential line passing through the second plurality of circumferentially aligned surfaces;
a third plurality of circumferentially aligned surfaces:
formed by the first portion of the first cover plate;
at a third acute angle with respect to a third circumferential line passing through the third plurality of circumferentially aligned surfaces;
aligned, in a direction parallel to the axis of rotation, with the first and second pluralities of circumferentially aligned surfaces; and,
a resilient element urging the second plurality of circumferentially aligned surfaces into contact with the first plurality of circumferentially aligned surfaces, wherein:
when first rotational torque is applied to the flywheel, the flywheel and the first and second cover plates rotate in unison; and,
when second rotational torque, greater than the first rotational torque, is applied to the flywheel, the first plurality of circumferentially aligned surface is arranged to slide across the second plurality of circumferentially aligned surfaces such that the flywheel rotates with respect to the first and second cover plates.

13. The slip clutch of claim 12, wherein when the second rotational torque is applied to the flywheel, the first and second cover plates are arranged to axially displace away from the flywheel.

14. The slip clutch of claim 12, wherein:
when the first rotational torque is applied to the flywheel, a first surface in the first plurality of circumferentially aligned surfaces remains in contact with a second surface in the second plurality of circumferentially aligned surfaces; and,
when the second rotational torque is applied to the flywheel, the first surface slides across the second surface to engage a third surface in the second plurality of circumferentially aligned surfaces.

15. A slip clutch, comprising:
a flywheel arranged to receive torque;
a backing plate fixedly connected to the flywheel;
a vibration damper including:
first and second axially displaceable cover plates;
a flange:
for transmitting torque from the vibration damper; and,
rotatable with respect to the first and second cover plates; and,
at least one spring engaged with the first and second cover plates and the flange; and,
a slip assembly, including:
a first plurality of circumferentially aligned surfaces:
fixedly connected to the flywheel or formed from a same piece of material as the flywheel; and,
at a first acute angle with respect to a first circumferential line passing through the first plurality of circumferentially aligned surfaces;
a second plurality of circumferentially aligned surfaces:
formed by a first portion of the first cover plate radially outward of the at least one spring; and,
at a second acute angle with respect to a second circumferential line passing through the second plurality of circumferentially aligned surfaces; and,
at least one cylindrically-shaped element axially disposed between the first and second pluralities of circumferentially aligned surfaces and engaged with the first and second pluralities of circumferentially aligned surfaces; and,
a resilient element engaged with the backing plate and the second cover plate and urging the first cover plate toward the flywheel, such that the first and second pluralities of circumferentially aligned surfaces are in compressive engagement contact with the at least one cylindrically-shaped element.

16. The slip clutch of claim 15, wherein the first and second acute angles are equal.

17. The slip clutch of claim 15, wherein:
for a first amount of rotational torque applied to the flywheel, the flywheel and the first and second cover plates are arranged to rotate in unison; and,
for a second amount of rotational torque, greater than the first amount, applied to the flywheel, the flywheel is arranged to at least partially rotate with respect to the first and second cover plates.

18. The slip clutch of claim 17, wherein for the second amount of rotational torque applied to the flywheel, the at least one cylindrically-shaped element is arranged to roll with respect to the first and second pluralities of circumferentially aligned surfaces.

19. The slip clutch of claim 15, wherein the resilient element is radially outward of the at least one spring.

20. The slip clutch of claim 15, wherein the at least one cylindrically-shaped element is radially outward of the at least one spring.

* * * * *